INVENTOR
Nobuhisa Kodaira
BY
Alvin Browdy
Attorney 3,327,772
**CONSTANT TEMPERATURE HEATING APPARA-
TUS USING THERMAL MEDIUM VAPOR**
Nobuhisa Kodaira, 851 Kamirenjaku, Mitaka-shi,
Tokyo, Japan
Filed Nov. 29, 1965, Ser. No. 510,264
Claims priority, application Japan, Nov. 30, 1964,
39/66,932
3 Claims. (Cl. 165—32)

ABSTRACT OF THE DISCLOSURE

A constant temperature heating apparatus in which a closed chamber contains a thermal-responsive fluid having a liquid and vapor phase, a supply tank for receiving condensed vapor and feeding by gravity liquid to the chamber; an electrical heating element in the closed chamber and an electro-magnetic valve controlling condensed fluid flow to the supply tank; a vapor-responsive sensing device connected to the vapor of the closed chamber and alternatively controlling circuits to the heating element or valve to maintain a substantially constant temperature in the closed chamber.

---

The present invention relates to an improvement in a constant temperature heating apparatus for various industrial uses.

The constant temperature heating apparatus in the prior art was of such type that an inner space of an enclosed vessel was evacuated and charged with thermal medium liquid in a sealing manner, a heater being immersed in the thermal medium liquid to heat the liquid, and the constant temperature chamber was encircled by thermal medium vapor generated from the thermal medium liquid so as to maintain the inside of the chamber at a constant temperature.

Although the above-referred type of apparatus was advantageous for maintaining a constant temperature chamber always at a predetermined temperature, it was quite unsuitable either in the case of maintaining a high temperature state for a predeterminated period of time and thereafter abruptly changing to and maintaining a low temperature state for another predetermined period of time such as, for example, in the case of a chemical reaction vat in which reaction heat is generated in the course of heating and so cooling is carried out suddenly, or in the case of abruptly cooling after heating for a predetermined period of time such as, for example, in the case of special heat treatment.

An object of the present invention is the provision of a constant temperature heating apparatus using thermal medium vapor which enables to maintain a high temperature state for a predetermined period of time and thereafter abruptly change to a low temperature state.

Figure 1:
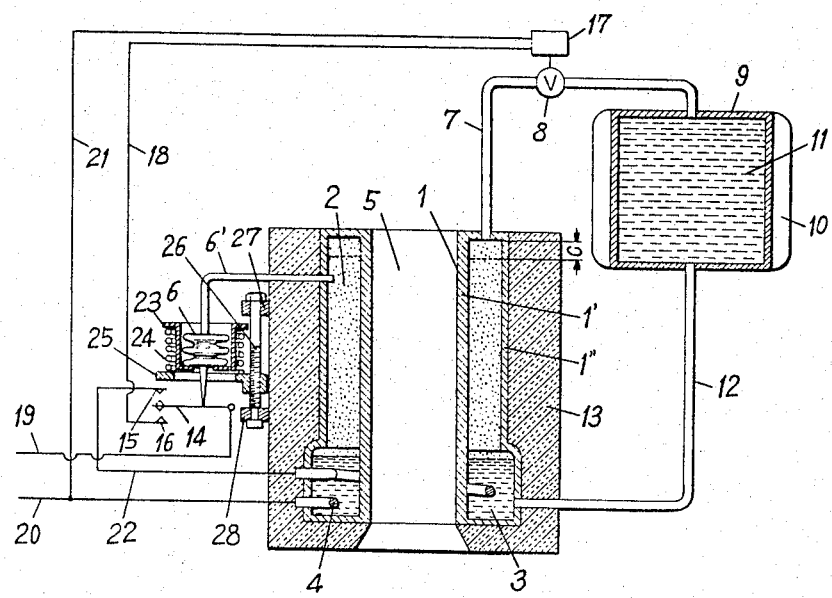
Figure 2:
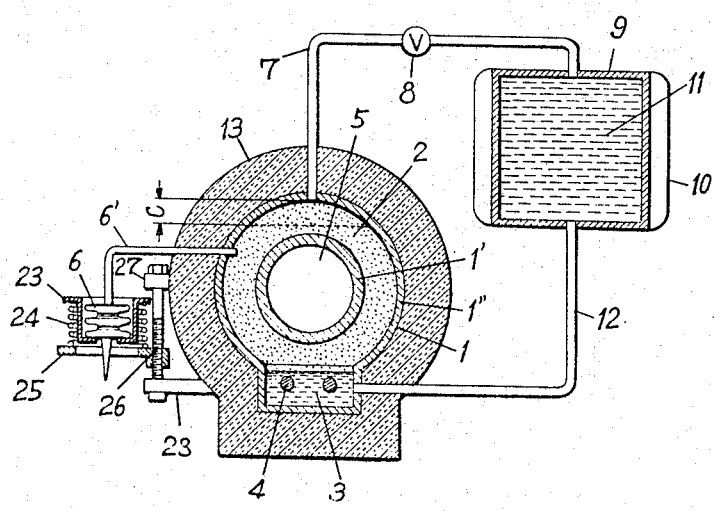

FIG. 1 is a longitudinal cross section view showing one embodiment of the present invention, and FIG. 2 is a longitudinal cross section view showing another embodiment.

In FIG. 1, an enclosed vessel 1 is a vertical type of vessel provided with an inner wall 1' and an outer wall 1", in which an enclosed vapor chamber is formed between the inner wall 1' and the outer wall 1", in the bottom portion of the chamber is charged thermal medium liquid 3, in said thermal medium liquid 3 is immersed a heater 4 for heating the thermal medium liquid 3, and inside of the inner wall 1' is formed a heating chamber 5 in which a chemical reaction vat or the like or a subject to be heat-treated is disposed.

6 is a bellows, 6' is a pipe for connecting the bellows 6 and the vapor chamber 2, 7 is an upper coupling pipe for connecting the top of the enclosed vessel and the top of the cooling thermal medium liquid tank 9, and 8 is a valve provided in the midway of the upper coupling pipe.

10 is an air cooling fin provided on the outer wall of the cooling thermal medium liquid tank 9. However, in the case of repeating cooling and heating operations, it is desirable to employ water cooling instead of the air cooling since the cooling effect of the latter is too small.

12 is a lower coupling pipe for connecting the bottom of the cooling thermal medium liquid tank 9 and the lower portion of the enclosed vessel 1.

The cooling thermal medium liquid tank 9 is mounted at a position higher than the enclosed vessel 1. Consequently, when the valve 8 is opened to equalize the pressure in the enclosed vessel 1 and the pressure in the cooling thermal medium liquid tank 9, the thermal medium liquid 11 in said cooling thermal medium liquid tank 9 flows down by itself through the lower coupling pipe 12 into the enclosed vessel 1 so as to fill the vessel with a slight gap space C remaining between the surface of the thermal medium liquid 3 and the top of the enclosed vessel 1.

For this purpose, in the thermal medium liquid tank 9 is preliminarily charged the thermal medium liquid sufficient in volume to fill the enclosed vessel 1 with a slight gap space C remaining at the top when the valve 8 is opened. Also the volume of the thermal medium liquid 3 in the enclosed vessel 1 when the valve 8 is closed, is selected so as to be sufficient to immerse the heater 4 therein. This is for the purpose of causing the heat generated from the heater 4 to directly transfer to the thermal medium liquid 3.

13 is a heat insulator provided around the periphery of the enclosed vessel 1, 14 is a transfer switch to be actuated by the bellows 6, 15 is a heater contact, 16 is a valve contact, 17 is an electromagnet for opening and closing the valve 8, 18 is a wire for connecting the valve contact 16 and the electromagnet 17, 19 and 20 are power line wires, 21 is a wire for connecting the power line wire 20 and the electromagnet 17, and 22 is a wire for connecting the heater contact 15 and the heater 4.

23 is a spring seat mounted at the lower end of the bellows 6, 24 is a spring, 25 is a regulating disc, 26 is a regulating screw rod threadably engaged with the regulating disc 25, and 27 and 28 are brackets.

The embodiment shown in FIG. 2 comprises an enclosed vessel 1 having its configuration designed in a horizontal type, and with respect to other structures it is the same as that shown in FIG. 1.

The state shown in FIG. 1 is such that thermal medium vapor 2 at a predetermined temperature occupies the upper portion of the inner space of the enclosed vessel 1, while thermal medium liquid 3 at the predetermined heating temperature exists in the lower portion of the same, and thus the subject to be heat-treated (not shown) in the heating chamber 5 is maintained at a constant temperature state.

At this point of time, the valve 8 is closed, and the bellows 6 is forced downwardly at a saturated pressure associated with a saturated temperature of the thermal medium vapor 2. However, since the bellows 6 is forced upwardly due to the action of the spring 24, these two forces are balanced with each other so that the lower end of the bellows 6 is kept still.

Then the transfer switch 14 which is engaged with the bellows 6 makes contact neither with the heater contact 15 nor the valve contact 16, so that each of the heater 4 and the electromagnet for valve 17 does not operate.

When a certain period of time has elapsed under the above-mentioned state and the temperature of the thermal medium vapor 2 has lowered from the predetermined temperature, the pressure of the vapor also lowers so that the bellows 6 contracts due to the fact that the tension of the bellows 6 is overcome by the resilient force of the spring 24, consequently the transfer switch 14 moves upwardly so as to engage with the heater contact 15 to supply electric power to the heater 4, and thus the thermal medium liquid 3 is heated up by the heat generated from the heater 4 and generates the thermal medium vapor 2 which results in rise of the temperature and pressure of the thermal medium vapor 2 to the predetermined values.

At this time, the pressure acting upon the bellows 6 also increases, and against the resilient force of the spring 24 the bellows 6 expands to press down the transfer switch 14 so as to disengage from the heater contact 15 to switch off the power source for the heater 4.

In this way the temperature of the thermal medium vapor 2 may be maintained constant over a long period of time. However, when the temperature of the thermal medium vapor 2 is to be regulated finely, the fine regulation of the temperature may be achieved by slightly turning the regulating screw rod 26 to somewhat vary the resilient force of the spring 24 and thus regulating the pressure at which the bellows 6 expands or contracts.

When the subject to be heat-treated in the heating chamber 5 is to be cooled abruptly, by turning the regulating screw rod 26 the regulating disc 25 is largely lowered down to expand the bellows 6 downwardly which causes the transfer switch 14 to make contact with the valve contact 16 to energize the electromagnet 17, which in turn opens the valve 8 to equalize the pressure in the enclosed chamber 1 and the pressure in the tank 9, so that the thermal medium liquid 11 at a lower temperature cooled in the tank 9 may be caused to flow down by itself through the lower coupling pipe 12 into the enclosed vessel 1 to abruptly cool the enclosed vessel 1 and thereby cool the subject to be heat-treated in the heating chamber 5.

Then a certain gap space C is retained between the top wall of the enclosed vessel 1 and the surface of the thermal medium liquid. In case that the thermal medium liquid in the enclosed vessel 1 is heated to generate its vapor due to either a large heat capacity or head generation of the subject to be heat-treated in the heating chamber, the vapor will accumulate in the above-mentioned gap space C, then flows into the tank 9 through the upper coupling pipe, where it will be cooled and condensed, and finally it again flows into the enclosed vessel as thermal medium liquid at a lower temperature through the lower coupling pipe to repeat the cooling effect.

After the subject to be heat-treated has been cooled to a predetermined temperature in the above-mentioned manner, if it is desired to maintain again a higher temperature state, by turning the regulating screw rod 26 the regulating disc 25 is moved upwardly to make the bellows 6 contract, which causes the transfer switch 14 to make contact with the heater contact 15 so that the thermal medium 3 is heated by the heater 4 to generate thermal medium vapor.

Then the electromagnet 17 closes the valve 8 since the valve contact 16 is closed. Accordingly, the generated thermal medium vapor accumulates in the preliminarily retained gap space C as described above, so that as the pressure of the vapor gradually grows up, it presses down the surface of the thermal medium liquid 3 and thus it pushes back the thermal medium liquid 3 into the tank 11 through the lower coupling pipe 12, whereby the surface of the thermal medium liquid 3 may be lowered again to the position shown in FIG. 1.

As described, according to the present invention, it is possible to abruptly change from the higher temperature state to the lower temperature state, for instance, from 700° to 100° F., and especially if the thermal medium liquid is replaced by Freon gas or the like, it is possible to lower the temperature to about −70° F. Of course, in this case it is required to cool the cooling tank 9 by means of a refrigerator machine or cold medium at a temperature lower than the necessitated cooling temperature, but this can widely increase the applicable scope of the subjects to be heat-treated.

What I claim is:

1. A system for maintaining a constant temperature including in combination:

a vessel having a closed chamber;
a thermal medium fluid in said chamber and having a normal liquid phase and vapor phase when subjected to a predetermined temperature in said chamber;
a supply tank for the thermal medium fluid for containing a liquid supply thereof, said supply tank being disposed above a lower portion of said chamber and including pipe means connected to a lower portion of said chamber for gravity-feeding liquid thereto;
a cooling pipe means connected to an upper portion of said chamber for receiving vapor therefrom and directing it to said supply tank;
electrically-controlled valve means interposed in said cooling pipe means for controlling fluid-flow therethrough;
an electrical heater means in a lower portion of said chamber and normally immersed in liquid for heating the thermal medium fluid to produce a vapor therefrom;
a circuit for supplying current to said heater or valve means,
 said circuit including spaced contacts exteriorly of said vessel respectively connected in series with said heater or valve means, and switch means displaceably positioned between said contacts for alternately closing the circuit thereto; and
pressure-responsive displaceable sensing means exteriorly of said vessel and having a portion communicating with the upper portion of said chamber for sensing vapor pressure therein,
 said sensing means being operatively connected to said switch means for moving the switch means between said contacts and into engagement with one or the other of said contacts.

2. The system as claimed in claim 1 in which said pressure responsive sensing means comprises an axially expansible bellows interiorly communicating with said chamber, and biasing means engaged with said bellows and normally urging the bellows in a direction for closing contact between the switch means and contact controlling the circuit to activate said heater means.

3. The system as claimed in claim 2 in which said biasing means comprises a coil spring circumposed about said bellows, a support bracket on said vessel, said spring being engaged between said bellows and said bracket for urging the bellows in a direction opposite its normal expansion due to increased pressure in said chamber, and adjusting means connected to said bracket for adjusting the position of said bellows with respect to said contacts and switch means whereby the temperature range of said system is preset.

References Cited

UNITED STATES PATENTS

Re. 21,748  3/1941  Stemme _____ 165—26 X
3,272,258  9/1966  Bourquard _____ 165—26

ROBERT A. O'LEARY, *Primary Examiner*.

M. A. ANTONAKAS, *Assistant Examiner*.